US012662120B2

(12) United States Patent (10) Patent No.: US 12,662,120 B2
Sugiyama et al. (45) Date of Patent: Jun. 23, 2026

(54) DRIVE ASSIST APPARATUS FOR VEHICLE

(71) Applicant: SUBARU CORPORATION, Tokyo (JP)

(72) Inventors: Taiki Sugiyama, Tokyo (JP); Yuichiro Tsukasaki, Tokyo (JP); Yasushi Takaso, Tokyo (JP); Kouki Takayama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 331 days.

(21) Appl. No.: 18/133,030

(22) Filed: Apr. 11, 2023

(65) Prior Publication Data

US 2023/0347892 A1 Nov. 2, 2023

(30) Foreign Application Priority Data

Apr. 27, 2022 (JP) ................................ 2022-073719

(51) Int. Cl.
B60W 30/16 (2020.01)
B60W 40/04 (2006.01)

(52) U.S. Cl.
CPC ............ B60W 30/16 (2013.01); B60W 40/04 (2013.01); B60W 2420/403 (2013.01); B60W 2554/802 (2020.02); B60W 2554/804 (2020.02)

(58) Field of Classification Search
CPC .... B60W 30/16; B60W 30/165; B60W 40/04; B60W 2420/403; B60W 2420/408;
(Continued)

(56) References Cited

U.S. PATENT DOCUMENTS 9,272,711 B1 * 3/2016 Sivaraman ............. G08G 1/161
2005/0171669 A1 * 8/2005 Sato .................... B60W 30/188
701/51
(Continued)

FOREIGN PATENT DOCUMENTS

JP 2018-203252 A 12/2018

OTHER PUBLICATIONS

Office Action issued in Japanese Patent Application No. 2022-073719 dated Oct. 28, 2025 (including English translation).

*Primary Examiner* — David P. Merlino
(74) *Attorney, Agent, or Firm* — TROUTMAN PEPPER LOCKE LLP

(57) ABSTRACT

A drive assist apparatus for a vehicle includes: a driving environment recognizer recognizing driving environment information on outside of the vehicle; a target vehicle-to-vehicle distance setter setting a target preceding vehicle distance to a preceding vehicle; and a driving controller performing driving control for maintaining a preceding vehicle distance at the target preceding vehicle distance. When a vehicle driving path is congested, the target vehicle-to-vehicle distance setter sets an extended target preceding vehicle distance and a target following vehicle distance. When the vehicle driving path is congested, the driving controller calculates a target acceleration for maintaining a following vehicle distance at the target following vehicle distance, determines whether to permit acceleration or deceleration, performs acceleration control when the target acceleration is an acceleration-side value and acceleration is permitted, and performs deceleration control when the target acceleration is a deceleration-side value and deceleration is permitted.

16 Claims, 10 Drawing Sheets

(58) Field of Classification Search
CPC ..... B60W 2554/802; B60W 2554/804; B60W 2552/30; B60W 2552/53; B60W 2556/50; B60W 2720/106; B60W 2754/30
See application file for complete search history.

(56) References Cited

U.S. PATENT DOCUMENTS

| 2016/0200318 | A1  | 7/2016  | Parikh et al. |              |
| 2016/0304092 | A1* | 10/2016 | Rebhan        | B60W 30/16   |
| 2018/0050697 | A1* | 2/2018  | Kuszmaul      | B60W 40/1005 |
| 2019/0263403 | A1* | 8/2019  | Choi          | B60W 30/146  |
| 2020/0201356 | A1* | 6/2020  | Schuh         | B60W 30/165  |
| 2020/0361486 | A1* | 11/2020 | Mielenz       | B60W 60/0015 |

\* cited by examiner

DRIVE ASSIST APPARATUS FOR VEHICLE

CROSS-REFERENCE TO RELATED APPLICATION

The present application claims priority from Japanese Patent Application No. 2022-073719 filed on Apr. 27, 2022, the entire contents of which are hereby incorporated by reference.

BACKGROUND

The disclosure relates to a drive assist apparatus for a vehicle, which is configured to cause the vehicle to drive following the preceding vehicle.

In recent years, for vehicles such as automobiles, drive assist apparatuses configured to assist the driver's driving operations have been put into practical use with the aim of reducing the burden on the driver's driving operations and improving safety. Drive assist control of such a drive assist apparatus is basically realized by having the adaptive cruise control (ACC) function, the active lane keep centering (ALKC) function, and the like.

With the ACC function, the drive assist apparatus performs cruise control that, when there is no preceding vehicle, maintains a set vehicle speed set by the driver who drives the vehicle. Moreover, when a preceding vehicle is detected, the drive assist apparatus performs adaptive cruise control maintaining a certain distance from the preceding vehicle.

Furthermore, drive assist control in recent years has extended the scope of application of the ACC function even to control in traffic jams in the low speed range (from 0 Km/h). In such drive assist control, it is particularly desirable to perform driving control that takes into account not only the behavior of the preceding vehicle but also the behavior of the following vehicle. In contrast, for example, Japanese Unexamined Patent Application Publication (JP-A) No. 2018-203252 discloses technology in which, when there is a risk of the following vehicle causing a rear-end collision with the vehicle, the distance between the vehicle and the preceding vehicle (target vehicle-to-vehicle distance) is automatically reduced to maintain a safe distance between the vehicle and the following vehicle.

SUMMARY

An aspect of the disclosure provides a drive assist apparatus for a vehicle. The drive assist apparatus includes a driving environment recognizer, a target vehicle-to-vehicle distance setter, and a driving controller. The driving environment recognizer is configured to recognize driving environment information on outside of the vehicle. The outside includes an area ahead of the vehicle and an area behind the vehicle. The target vehicle-to-vehicle distance setter is configured to set a target preceding vehicle distance to a preceding vehicle when the preceding vehicle is recognized based on the driving environment information. The driving controller is configured to perform driving control for maintaining a preceding vehicle distance from the vehicle to the preceding vehicle at the target preceding vehicle distance. The target vehicle-to-vehicle distance setter is configured to, when a driving path of the vehicle is congested, set an extended target preceding vehicle distance by extending the target preceding vehicle distance by a set distance, and to set a target following vehicle distance to a following vehicle. The driving controller is configured to, when the driving path is congested: calculate a target acceleration for maintaining a following vehicle distance from the vehicle to the following vehicle at the target following vehicle distance; determine whether to permit the vehicle to accelerate or decelerate based on a relative relationship between the preceding vehicle distance and the extended target preceding vehicle distance; perform acceleration control using the target acceleration when the target acceleration is a value on an acceleration side and the driving controller determines to permit the vehicle to accelerate; and perform deceleration control using the target acceleration when the target acceleration is a value on a deceleration side and the driving controller determines to permit the vehicle to decelerate.

An aspect of the disclosure provides a drive assist apparatus for a vehicle. The drive assist apparatus includes circuitry. The circuitry is configured to receive recognized driving environment information on outside of the vehicle. The outside includes an area ahead of the vehicle and an area behind the vehicle. The circuitry is configured to set a target preceding vehicle distance to a preceding vehicle when the preceding vehicle is recognized based on the driving environment information. The circuitry is configured to perform driving control for maintaining a preceding vehicle distance from the vehicle to the preceding vehicle at the target preceding vehicle distance. The circuitry is configured to, when a driving path of the vehicle is congested, set an extended target preceding vehicle distance by extending the target preceding vehicle distance by a set distance, and to set a target following vehicle distance to a following vehicle. The circuitry is configured to, when the driving path is congested: calculate a target acceleration for maintaining a following vehicle distance from the vehicle to the following vehicle at the target following vehicle distance; determine whether to permit the vehicle to accelerate or decelerate based on a relative relationship between the preceding vehicle distance and the extended target preceding vehicle distance; perform acceleration control using the target acceleration when the target acceleration is a value on an acceleration side and the circuitry determines to permit the vehicle to accelerate; and perform deceleration control using the target acceleration when the target acceleration is a value on a deceleration side and the circuitry determines to permit the vehicle to decelerate.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

There is a concern that, as in the technology disclosed in JP-A No. 2018-203252, if control is performed against the risk of the following vehicle causing a rear-end collision simply by reducing the target vehicle-to-vehicle distance from the preceding vehicle, it may be difficult to maintain a sufficient safe distance from the following vehicle.

In contrast, in recent years where the spread and sophistication of drive assist apparatuses has progressed, it is desirable to perform driving control that takes into account the traffic flow including the following vehicle, especially in traffic jams.

It is desirable to provide a drive assist apparatus for a vehicle, capable of performing appropriate driving control that takes into account the traffic flow including the following vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
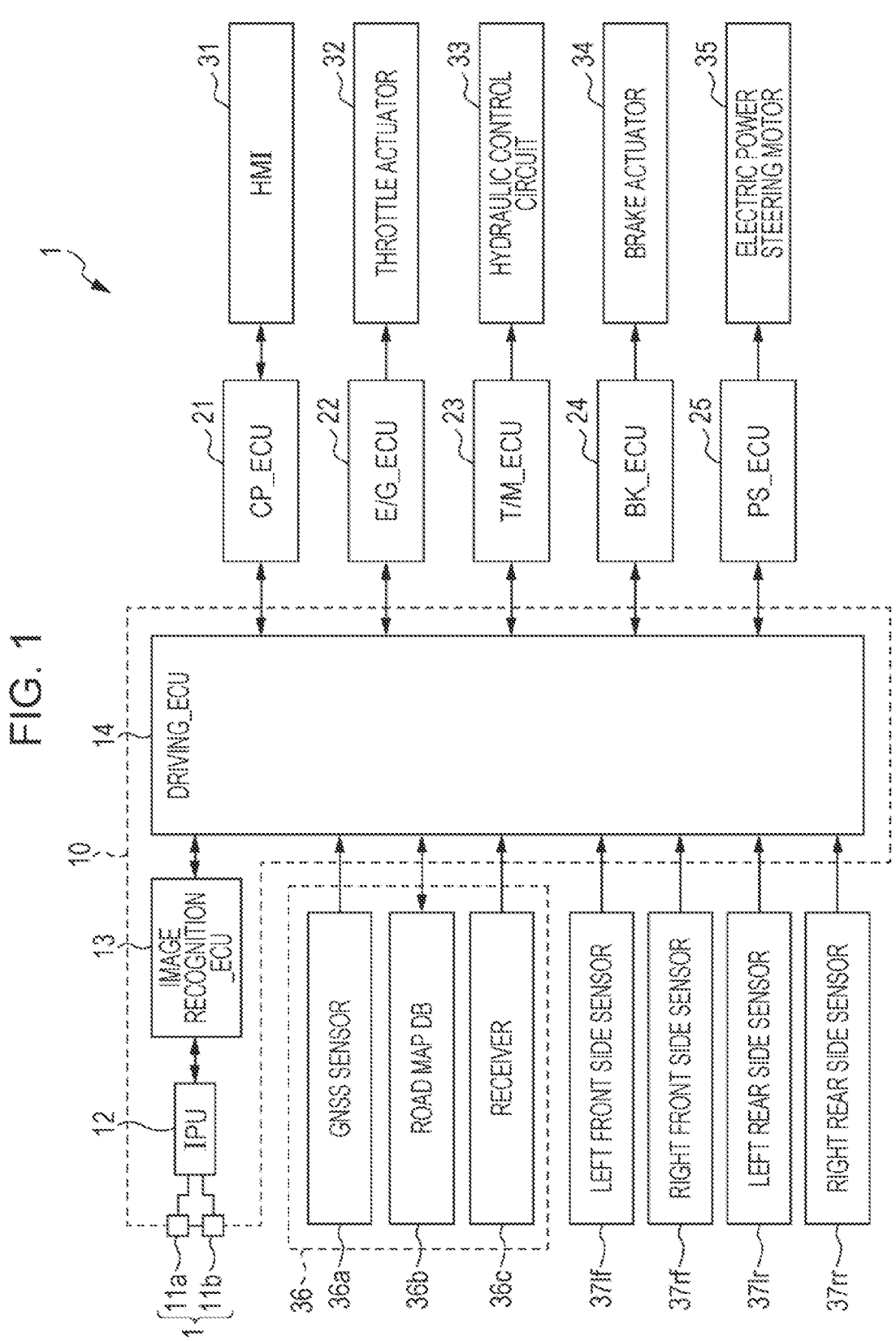
FIG. 1 is a schematic diagram of a drive assist apparatus.
Figure 2:
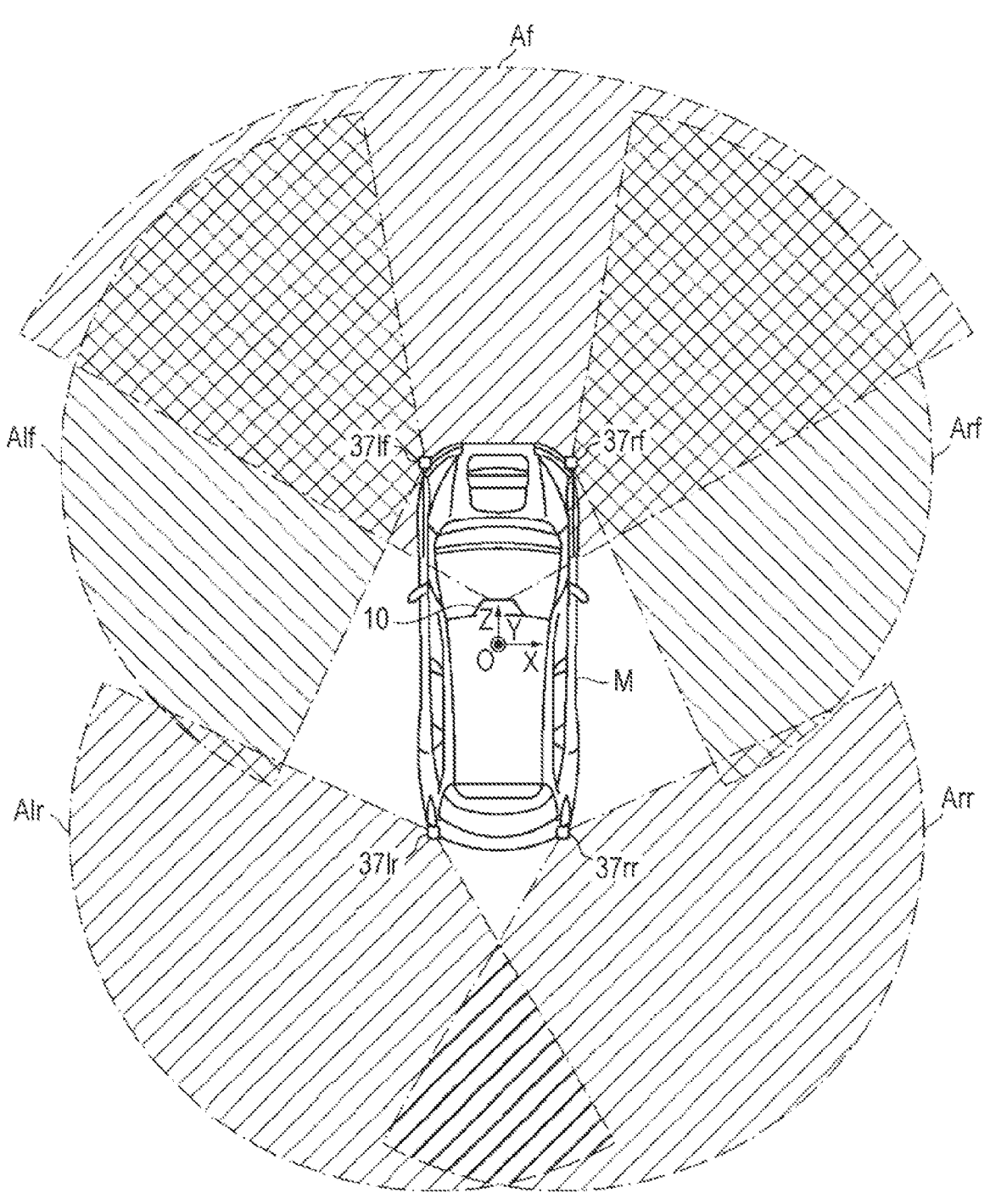
FIG. 2 is an explanatory diagram illustrating the monitoring regions of a stereo camera and radars.

As illustrated in FIGS. 1 and 2, a drive assist apparatus 1 includes, for example, a camera unit 10 fixed at the front and upper center of the cabin of a vehicle M.

The camera unit 10 includes a stereo camera 11, an image processing unit (IPU) 12, an image recognition unit (image recognition electronic control unit (ECU)) 13, and a driving control unit (driving_ECU) 14.

The stereo camera 11 includes a main camera 11a and a sub-camera 11b. The main camera 11a and the sub-camera 11b are composed of, for example, complementary metal-oxide semiconductor (CMOS) or the like. The main camera 11a and the sub-camera 11b are disposed at symmetrical positions on the left and right across the center in the vehicle width direction.

The main camera 11a and the sub-camera 11b perform stereo imaging of the driving environment in an area Af (see FIG. 2) ahead outside the vehicle M from different viewpoints. The imaging cycles of the main camera 11a and the sub-camera 11b are synchronized with each other.

The IPU 12 applies certain image processing to driving environment images captured by the stereo camera 11. In doing so, the IPU 12 detects the edges of various targets such as three-dimensional objects and section lines on the road surface that are represented on the images. Then, the IPU 12 obtains distance information from a positional shift amount between corresponding edges on the left and right images. In doing so, the IPU 12 generates image information including the distance information (distance image information).

Based on the distance image information received from the IPU 12, the image recognition_ECU 13 obtains the road curvatures [1/m] of section lines dividing the left and right of the lane (vehicle route) in which the vehicle M drives, and the width (lane width) between the left and right section lines. In addition, the image recognition_ECU 13 also obtains the road curvatures of section lines dividing the left and right of a lane adjacent to the lane in which the vehicle M drives and the width between the left and right section lines. Various methods for obtaining the road curvatures and the lane width are known. For example, the image recognition_ECU 13 applies binary processing based on luminance to each pixel of the distance image. In doing so, the image recognition_ECU 13 extracts section line candidate points on the road. In addition, the image recognition_ECU 13 applies curve approximation using the least-squares method to a point sequence of the extracted section line candidate points. In doing so, the image recognition_ECU 13 obtains the curvatures of the left and right section lines for each certain section. Furthermore, the image recognition_ECU 13 calculates the lane width from the difference between the curvatures of the left and right section lines.

In addition, the image recognition_ECU 13 applies certain pattern matching to the distance image information. In doing so, the image recognition_ECU 13 recognizes three-dimensional objects, such as guardrails, curbs, and median strips extending along the road, and surrounding vehicles. Here, in the recognition of a three-dimensional object by the image recognition_ECU 13, for example, the type of the three-dimensional object, the distance to the three-dimensional object, the speed of the three-dimensional object, and the relative speed between the three-dimensional object and the vehicle M are recognized.

These various types of information recognized by the image recognition_ECU 13 are output as driving environment information to the driving_ECU 14.

As described above, in one embodiment, the image recognition_ECU 13 may serve as a "driving environment recognizer configured to recognize driving environment information outside the vehicle", along with the stereo camera 11 and the IPU 12.

The driving_ECU 14 is a control unit configured to perform overall control of the drive assist apparatus 1.

Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are connected to the driving_ECU 14 via an in-vehicle communication line such as a controller area network (CAN).

Furthermore, various sensors such as a locator unit 36, a left front side sensor 371f, a right front side sensor 37rf, a left rear side sensor 371r, and a right rear side sensor 37rr are connected to the driving_ECU 14.

A human machine interface (HMI) 31 located around the driver's seat is connected to the CP_ECU 21. The HMI 31 includes, for example, operation switches configured to set and execute various types of drive assist control, a mode selection switch configured to switch the drive assist mode, a steering touch sensor configured to detect the driver's steering state, a turn signal switch, a driver monitoring system (DMS) configured to recognize the driver's face and to detect the driver's line of sight, a touchscreen display, a combination meter, and a loudspeaker.

On receipt of a control signal from the driving_ECU 14, the CP_ECU 21 appropriately informs, by means of display and sound using the HMI 31, the driver of various warnings for the preceding vehicle, etc., the implementation status of drive assist control, and various types of information related to the driving environment of the vehicle M.

Moreover, the CP_ECU 21 outputs various types of input information, such as the on or off operation state of various types of drive assist control input by the driver via the HMI 31, the vehicle speed (set vehicle speed) Vs set to the vehicle M, and the operation state of the turn signal switch, to the driving_ECU 14.

A throttle actuator 32 for an electronically controlled throttle is connected to the output side of the E/G_ECU 22. Moreover, various sensors such as an accelerator sensor (not illustrated) are connected to the input side of the E/G_ECU 22.

The E/G_ECU 22 applies driving control to the throttle actuator 32 based on a control signal from the driving_ECU 14 or detection signals from various sensors. In doing so, the E/G_ECU 22 adjusts the amount of air intake of the engine and generates a desired engine output. In addition, the E/G_ECU 22 outputs signals such as an accelerator opening detected by various sensors to the driving_ECU 14.

A hydraulic control circuit 33 is connected to the output side of the T/M_ECU 23. In addition, various sensors such as a shift position sensor (not illustrated) are connected to the input side of the T/M_ECU 23. The T/M_ECU 23 applies hydraulic control to the hydraulic control circuit 33 based on an engine torque signal estimated by the E/G_ECU 22 or detection signals from various sensors. In doing so, the T/M_ECU 23 operates friction engagement elements, pulleys, and the like provided in the automatic transmission, and shifts the engine output at a desired transmission ratio. Moreover, the T/M_ECU 23 outputs signals such as a shift position detected by various sensors to the driving_ECU 14.

A brake actuator 34 is connected to the output side of the BK_ECU 24. The brake actuator 34 adjusts the brake fluid pressure output to a brake wheel cylinder provided in each wheel. In addition, various sensors such as a brake pedal sensor, a yaw rate sensor, a longitudinal acceleration sensor, and a vehicle speed sensor (none of which are illustrated) are connected to the input side of the BK_ECU 24.

The BK_ECU 24 applies driving control to the brake actuator 34 based on a control signal from the driving_ECU 14 or detection signals from various sensors. In doing so, the BK_ECU 24 appropriately generates, in each wheel, a braking force for performing forced braking control and yaw rate control of the vehicle M. The BK_ECU 24 also outputs signals such as the brake operation state, yaw rate, longitudinal acceleration, and vehicle speed detected by various sensors to the driving_ECU 14.

An electric power steering motor 35 is connected to the output side of the PS_ECU 25. The electric power steering motor 35 imparts steering torque due to the rotational force of the motor to the steering mechanism. Moreover, various sensors such as a steering torque sensor and a steering angle sensor are connected to the input side of the PS_ECU 25.

The PS_ECU 25 applies driving control to the electric power steering motor 35 based on a control signal from the driving_ECU 14 or detection signals from various sensors. In doing so, the PS_ECU 25 generates steering torque for the steering mechanism. In addition, the PS_ECU 25 outputs signals such as steering torque and a steering angle detected by various sensors to the driving_ECU 14.

The locator unit 36 includes a global navigation satellite system (GNSS) sensor 36a, a high-precision road map database (road map DB) 36b, and a receiver 36c.

The GNSS sensor 36a measures the position (latitude, longitude, and altitude) of the vehicle M by receiving positioning signals transmitted from positioning satellites.

The road map DB 36b is a mass storage medium such as a hard disk drive (HDD). The road map DB 36b stores high-precision road map information (dynamic map). The road map information includes, for example, lane width data, lane center position coordinate data, lane progression azimuth angle data, and speed limit data as lane data necessary for autonomous driving. The lane data is stored at intervals of several meters for each lane on the road map. For example, based on a request signal from the driving_ECU 14, the road map DB 36b outputs, as driving environment information, road map information in a set range with respect to the vehicle position measured by the GNSS sensor 36a to the driving_ECU 14.

The receiver 36c receives, for example, various traffic information transmitted from Vehicle Information Communication System (VICS (registered trademark)) or the like by road-to-vehicle communication. The traffic information received by the receiver 36c includes, for example, traffic congestion information, road regulation information due to accidents, weather, etc., and the like.

As described above, in one embodiment, the road map DB 36b may serve as a "driving environment recognizer configured to recognize driving environment information outside the vehicle", along with the GNSS sensor 36a.

The left front side sensor 371f and the right front side sensor 37rf are composed of, for example, millimeter wave radars. The left front side sensor 371f and the right front side sensor 37rf are disposed in the left and right side portions of the front bumper, for example. The left front side sensor 371f and the right front side sensor 37rf detect, as driving environment information, three-dimensional objects that are present in areas Alf and Arf, which are the front and side areas diagonally to the left and right of the vehicle M (see FIG. 2), and that are difficult to recognize in images of the stereo cameras 11.

The left rear side sensor 371r and the right rear side sensor 37rr are composed of, for example, millimeter wave radars. The left rear side sensors 371r and the right rear side sensors 37rr are disposed in the left and right side portions of the rear bumper, for example. The left rear side sensor 371r and the right rear side sensor 37rr detect, as driving environment information, three-dimensional objects that are present in areas Alr and Arr, which are the side and rear areas diagonally to the left and right of the vehicle M (see FIG. 2), and that are difficult to recognize with the left front side sensor 371f and the right front side sensor 37rf.

Here, when each radar is composed of a millimeter wave radar, the millimeter wave radar mainly detects three-dimensional objects such as vehicles driving along or behind the vehicle M by analyzing waves reflected from an object with respect to the output radio waves. In one example, each radar detects, as information on a three-dimensional object, the width of the three-dimensional object, the position of the representative point of the three-dimensional object (relative position with respect to the vehicle M), the speed of the three-dimensional object, and the like.

As described above, in one embodiment, the left front side sensor 371f, the right front side sensor 37rf, the left rear side sensor 371r, and the right rear side sensor 37rr may serve as a "driving environment recognizer configured to recognize driving environment information outside the vehicle".

The coordinates of each target outside the vehicle M included in the driving environment information recognized by each of the image recognition_ECU 13, the locator unit 36, the left front side sensor 371*f*, the right front side sensor 37*rf*, the left rear side sensor 371*r*, and the right rear side sensor 37*rr* are all converted by the driving_ECU 14 to coordinates in the three-dimensional coordinate system (see FIG. 2) with the center of the vehicle M as the origin.

The following driving modes are set to the driving_ECU 14: a manual driving mode; a first driving control mode and a second driving control mode, which are modes for driving control; and an evacuation mode. Each of these driving modes can be selectively switched by the driving_ECU 14 based on, for example, the operation status of the mode selection switch provided in the HMI 31.

Here, the manual driving mode is a driving mode that involves the driver to hold the steering wheel. That is, the manual driving mode is a driving mode in which the vehicle M is caused to drive according to the driver's driving operations such as a steering operation, an accelerator operation, and a brake operation.

Likewise, the first driving control mode is also a driving mode that involves the driver to hold the steering wheel. That is, the first driving control mode is a semi-autonomous driving mode in which the vehicle M is caused to drive while reflecting the driver's driving operations. The first driving control mode is realized by, for example, outputting various control signals from the driving_ECU 14 to the E/G_ECU 22, the BK_ECU 24, and the PS_ECU 25. In the first driving control mode, adaptive cruise control (ACC), active lane keep centering (ALKC), active lane keep bouncing (ALKB), and lane change control are performed in an appropriate combination. In doing so, the vehicle M is able to drive along the target driving route.

Here, adaptive cruise control (ACC) is basically performed based on driving environment information input from the image recognition_ECU 13 and the like.

In one example, the driving_ECU 14 performs cruise control as part of adaptive cruise control (ACC) when no preceding vehicle P is recognized ahead of the vehicle M by the image recognition_ECU 13 or the like. In the cruise control, the driving_ECU 14 sets a set vehicle speed Vs input by the driver as a target vehicle speed Vt. Then, the driving_ECU 14 applies acceleration/deceleration control to the vehicle M based on the target vehicle speed Vt. In doing so, the driving_ECU 14 maintains a vehicle speed V of the vehicle M at the set vehicle speed Vs.

Figure 3:
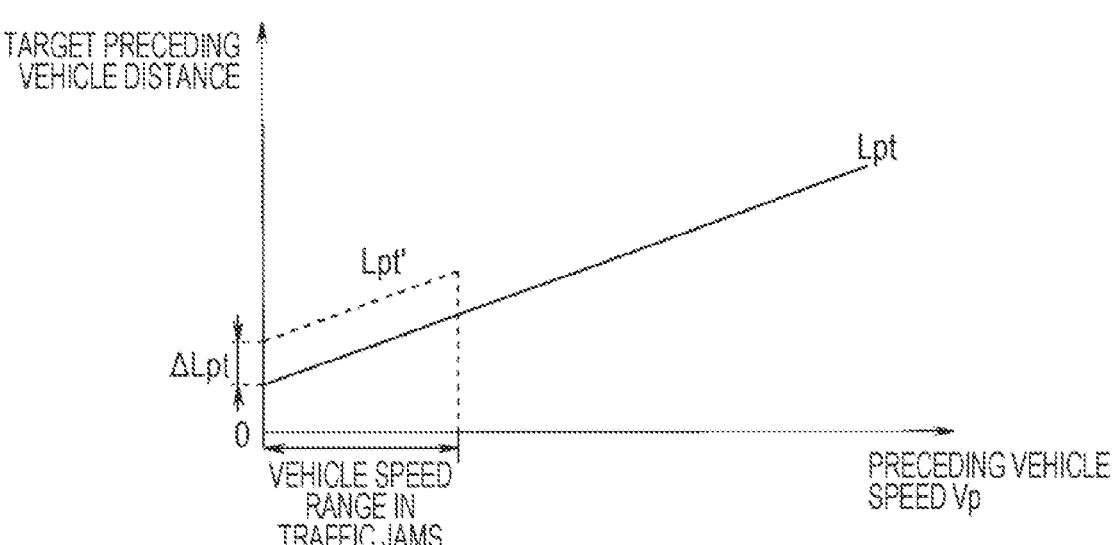
FIG. 3 is a map indicating the relationship between a preceding vehicle speed and a target vehicle-to-vehicle distance.

In contrast, the driving_ECU 14 performs adaptive cruise control (ACC) when a following vehicle P is recognized ahead of the vehicle M by the image recognition_ECU 13 or the like. In the adaptive cruise control, the driving_ECU 14 sets a target vehicle-to-vehicle distance (target preceding vehicle distance Lpt) based on the vehicle speed Vp of the preceding vehicle P or the like. The target preceding vehicle distance Lpt is set, for example, by referring to a map (see the solid line in FIG. 3) set in advance in the driving_ECU 14. The target preceding vehicle distance Lpt is set so as to become a greater value as the preceding vehicle speed Vp increases, for example.

Then, the driving_ECU 14 applies acceleration/deceleration control to the vehicle M based on the target preceding vehicle distance Lpt. In doing so, the driving_ECU 14 basically causes the vehicle M to drive following the preceding vehicle P while maintaining the preceding vehicle distance Lp at the target preceding vehicle distance Lpt.

Note that, when the vehicle driving path of the vehicle M (hereinafter may be referred to as "vehicle driving path") is congested, the driving_ECU 14 calculates an extended target preceding vehicle distance Lpt' in addition to the target preceding vehicle distance Lpt. The extended target preceding vehicle distance Lpt' is set, for example, by referring to a map (see the dashed line in FIG. 3) set in advance in the driving_ECU 14. As the extended target preceding vehicle distance Lpt', for example, a distance obtained by adding a preset distance ΔLpt to the target preceding vehicle distance Lpt is set. Although the distance ΔLpt is a fixed value in the present embodiment, the distance ΔLpt may be a variable value, such as increasing the distance ΔLpt as the preceding vehicle speed Vp increases. It is desirable that, based on driving tests conducted in advance or the like, the extended target preceding vehicle distance ΔLpt' be set to a distance that can prevent another vehicle from cutting in in front of the vehicle M.

Furthermore, the driving_ECU 14 sets a target following vehicle distance Lft to the following vehicle F. The target following vehicle distance Lft is, for example, a fixed value set in advance in the driving_ECU 14. Here, the target following vehicle distance Lft is, for example, a distance at which a driver who drives the following vehicle F is able to psychologically suppress the frequency of braking against the vehicle M during traffic jams, and is set based on driving tests conducted in advance or the like. Note that the driving_ECU 14 is also able to appropriately correct the target following vehicle distance Lft based on the relative relationship between the vehicle M and the following vehicle F (such as the average of the following vehicle distance Lf).

Then, when the extended target preceding vehicle distance Lpt' and the target following vehicle distance Lft are set, the driving_ECU 14 performs acceleration/deceleration control for maintaining the following vehicle distance Lf from the vehicle M to the following vehicle F at the target following vehicle distance Lft to the extent possible, while controlling the preceding vehicle distance Lp with respect to the extended target preceding vehicle distance Lpt'.

Figure 4:
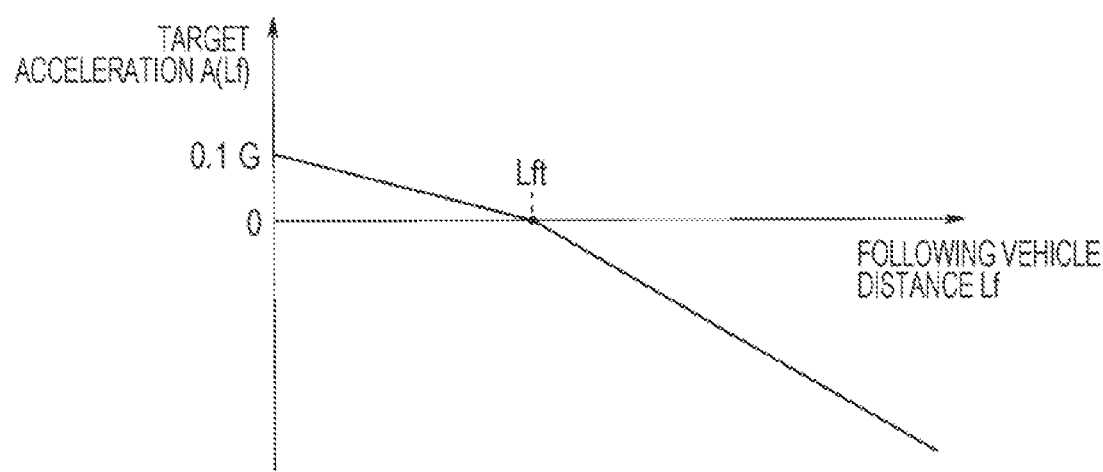
FIG. 4 is a map indicating the relationship between a following vehicle distance and a target acceleration.

To perform such acceleration/deceleration control, the driving_ECU 14 calculates a target acceleration A(Lf) for maintaining the following vehicle distance Lf at the target following vehicle distance Lft based on the following vehicle distance Lf. The calculation of the target acceleration A(Lf) is performed, in one example, by referring to a preset map or the like. That is, for example, as illustrated in FIG. 4, a map for calculating the target acceleration A(Lf) according to the following vehicle distance Lf is set in advance in the driving_ECU 14. Then, based on the map, the driving_ECU 14 calculates the target acceleration A(Lf) according to the following vehicle distance Lf. The target acceleration A(Lf) is set so as to accelerate the vehicle M with a greater acceleration as the following vehicle distance Lf becomes less than the target following vehicle distance Lft, and to decelerate the vehicle M with a greater deceleration as the following vehicle distance Lf becomes greater than the target following vehicle distance Lft. At that time, to suppress sudden acceleration, it is desirable that the upper limit of the target acceleration A(Lf) be 0.1 G or less.

In addition, the driving_ECU 14 determines whether to permit the vehicle M to accelerate or decelerate based on the relative relationship between the vehicle M and the preceding vehicle P. This acceleration/deceleration permission determination is basically performed based on the relative relationship between the distance between the vehicle M and the preceding vehicle P (preceding vehicle distance Lp) and the extended target preceding vehicle distance Lpt'. Note that it is desirable that the relative speed between the vehicle M and the preceding vehicle P (preceding vehicle relative speed Vrp (=Vp−V)) be reflected in this acceleration/deceleration permission determination.

In another example, the acceleration/deceleration permission determination is performed, for example, by referring to a preset map or the like. Therefore, a map (see FIG. 5) for determining whether to permit the vehicle M to accelerate or decelerate based on the preceding vehicle distance Lp and the preceding vehicle relative speed Vrp is set and stored in advance for each extended preceding vehicle distance Lpt' in the driving_ECU 14.

Figure 5:
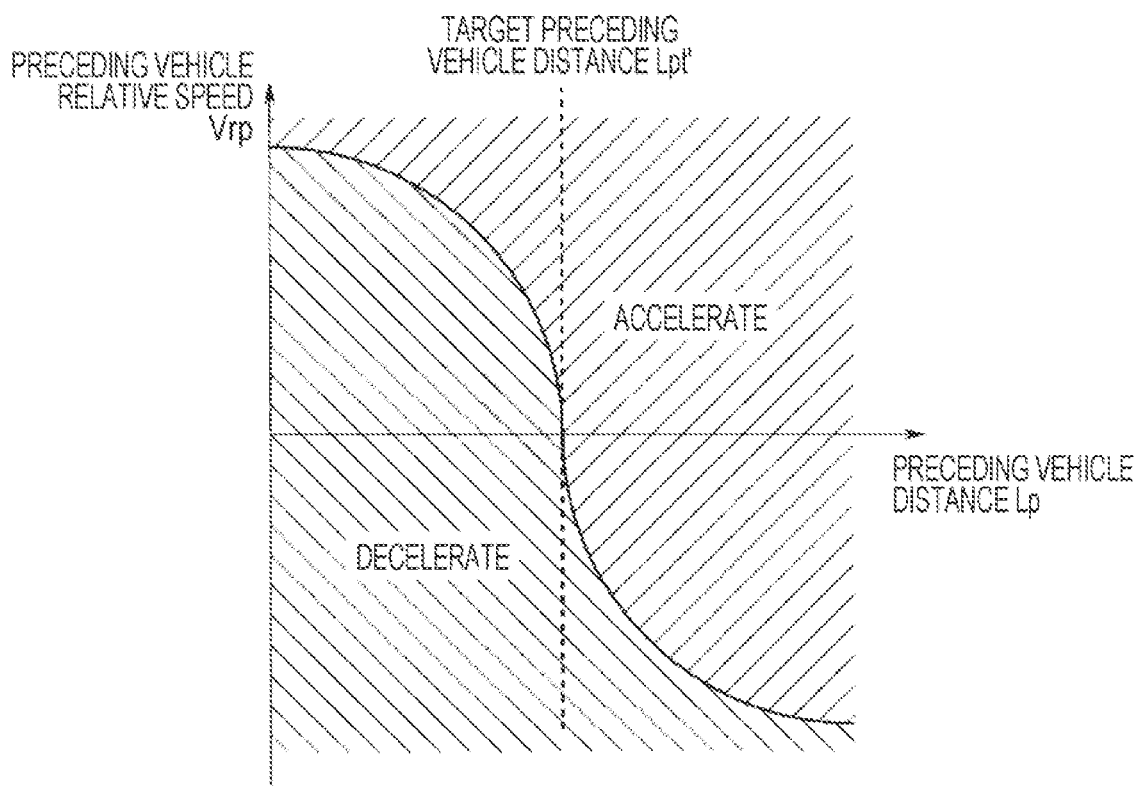
FIG. 5 is a map for determining whether to permit the vehicle to accelerate or decelerate.

As is clear from FIG. 5, in the determination map, basically a region where acceleration is permitted (acceleration-permitted region) and a region where deceleration is permitted (deceleration-permitted region) are set with respect to the extended target preceding vehicle distance Lpt'. That is, in the determination map, basically, a region where the preceding vehicle distance Lp is greater than the extended target preceding vehicle distance Lpt' is set as a region where the vehicle M is permitted to accelerate, and a region where the preceding vehicle distance Lp is less than the extended target preceding vehicle distance Lpt' is set as a region where the vehicle M is permitted to decelerate.

Note that, in order to reflect the preceding vehicle relative speed Vrp in the acceleration permission determination and the deceleration permission determination, an extended region is set to each of the acceleration-permitted region and the deceleration-permitted region. That is, on the determination map, a part of the acceleration-permitted region is extended to the region where the preceding vehicle distance Lp is less than the extended target preceding vehicle distance Lpt'. The extended acceleration-permitted region is set to become larger as the preceding vehicle relative speed Vrp becomes greater, for example. In addition, on the determination map, a part of the deceleration-permitted region is extended to the region where the preceding vehicle distance Lp is greater than the extended target preceding vehicle distance Lpt'. The extended deceleration-permitted region is set to become larger as the preceding vehicle relative speed Vrp becomes less (greater on the negative side), for example.

Based on the determination map as above, the driving_ECU 14 determines whether to permit acceleration or deceleration in accordance with the preceding vehicle distance Lp and the preceding vehicle relative speed Vrp.

Then, when the positive target acceleration A(Lf) is calculated based on the following vehicle distance Lf and when it is determined to permit acceleration based on the following vehicle distance Lf and the preceding vehicle relative speed Vrp, the driving_ECU 14 applies acceleration control to the vehicle M using the target acceleration A(Lf).

Meanwhile, when the negative target acceleration A(Lf) is calculated based on the following vehicle distance Lf and when it is determined to permit deceleration based on the following vehicle distance Lf and the preceding vehicle relative speed Vrp, the driving_ECU 14 applies deceleration control to the vehicle M using the target acceleration A(Lf).

As described above, in one embodiment, the driving_ECU 14 may serve as a "target vehicle-to-vehicle distance setter" and a "driving controller".

In addition, active lane keep centering (ALKC) and active lane keep bouncing (ALKB) are basically performed based on driving environment information input from one or more of the image recognition_ECU 13 and the locator unit 36. That is, the driving_ECU 14 sets a target route Rm along the left and right lane section lines, in the center of the vehicle driving lane based on, for example, lane section line information included in the driving environment information. Based on the target route Rm, the driving_ECU 14 performs feedforward control and feedback control of steering, thereby maintaining the vehicle M in the center of the lane. When the driving_ECU 14 determines that it is highly likely that the vehicle M will deviate from the vehicle driving lane due to crosswind, road cant, or the like, the driving_ECU 14 suppresses lane deviation through forced steering control.

The second driving control mode is a driving mode in which the vehicle M is caused to drive without involving the driver's steering, accelerator operation, or brake operation. That is, the second driving control mode is the so-called autonomous driving mode in which the vehicle M is caused to autonomously drive without involving the driver's driving operations. The second driving control mode is realized when, for example, the driving_ECU 14 outputs various control signals to the E/G_ECU 22, the BK_ECU 24, and the PS_ECU 25. In the second driving control mode, mainly, adaptive cruise control (ACC), active lane keep centering (ALKC), and active lane keep bouncing (ALKB) are performed in an appropriate combination. In doing so, the vehicle M is able to drive along the target route (route map information).

The evacuation mode is a mode for automatically stopping the vehicle M on the roadside strip or the like. The evacuation mode is executed when, for example, while the vehicle M is driving in the second driving control mode, when it becomes impossible to continue driving in the second driving control mode and when the driving operation cannot be handed over to the driver (that is, when the driving mode cannot be changed to the manual driving mode or the first driving control mode).

In the above-described driving modes, the driving_ECU 14 can appropriately apply emergency brake control (autonomous emergency braking (AEB)) or the like to an obstacle such as a vehicle that is highly likely to collide with the vehicle M.

Emergency brake control is basically control for avoiding a collision with an obstacle present ahead in the target route of the vehicle M by braking.

In the emergency brake control, the driving_ECU 14 detects, based on the driving environment information, obstacles such as preceding vehicles and stopped vehicles that are present in the target route. Furthermore, the driving_ECU 14 calculates a time to collision (TTC) to collide with an obstacle. This time to collision TTC is calculated based on the relative speed and the relative distance between the vehicle M and the obstacle.

Then, when the time to collision TTC becomes less than a preset first threshold Tth1, the driving_ECU 14 executes primary brake control. When the primary brake control is started, the driving_ECU 14 decelerates the vehicle M using, for example, a preset first target deceleration (such as 0.4 G).

Furthermore, when the time to collision TTC becomes less than a preset second threshold Tth2 (note that Tth2<Tth1), the driving_ECU 14 executes secondary brake control. When the secondary brake control is started, the driving_ECU 14 decelerates the vehicle M using a preset second target deceleration (such as 1 G) until the relative speed with the obstacle becomes "0".

Figure 6:
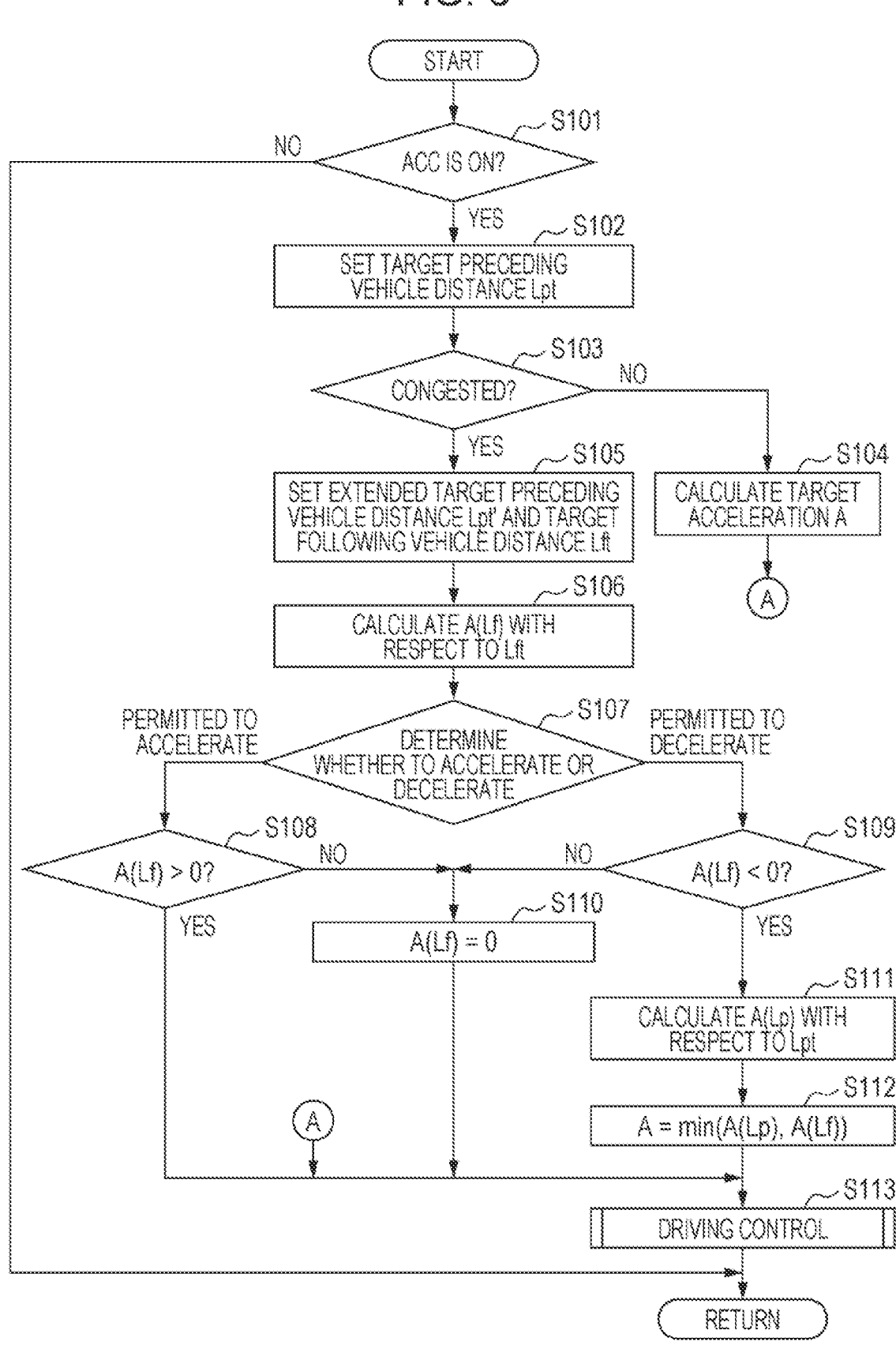
FIG. 6 is a flowchart illustrating an adaptive cruise control (ACC) routine.

Next, adaptive cruise control (ACC) will be described in accordance with the flowchart of an adaptive cruise control (ACC) routine illustrated in FIG. 6. The adaptive cruise control routine is repeatedly performed every set time by the driving_ECU 14.

When the routine starts, in step S101, the driving_ECU 14 checks whether the ACC function is turned on. Here, in the present embodiment, for example, in the case where the first driving control mode or the second driving control mode is selected as the driving mode, it is determined that the ACC function is turned on. Alternatively, even in the case where the manual driving mode is selected, for example, if the driver or the like performs an operation of turning on the ACC function on the HMI 31, it is determined that the ACC function is turned on.

Then, in the case where it is determined in step S101 that the ACC function is turned off (NO in step S101), the driving_ECU 14 exits the routine as it is.

In contrast, in the case where it is determined in step S101 that the ACC function is turned on (YES in step S101), the driving_ECU 14 proceeds to step S102.

In step S102, the driving_ECU 14 appropriately sets the target preceding vehicle distance Lpt, and then proceeds to step S103. That is, in the case where a preceding vehicle P is recognized in front of the vehicle M by the image recognition_ECU 13 or the like, the driving_ECU 14 refers to a preset map (see FIG. 3) or the like and sets the target preceding vehicle distance Lpt in accordance with the preceding vehicle speed Vp. In the case where no preceding vehicle P is recognized in front of the vehicle M, the driving_ECU 14 proceeds to step S103 as it is.

In step S103, the driving_ECU 14 checks whether the driving path of the vehicle M is currently congested. The congestion determination can be performed, for example, based on driving environment information recognized by the image recognition_ECU 13 or the like. That is, when multiple vehicles are recognized in a row in front of the preceding vehicle P by the image recognition_ECU 13 or the like and when the preceding vehicle speed Vp is less than or equal to a preset vehicle speed, the driving_ECU 14 determines that the vehicle driving path is currently congested. Alternatively, the driving_ECU 14 may perform the congestion determination based on information from VICS (registered trademark) or the like, for example.

Then, in the case where it is determined in step S103 that the vehicle driving path is not congested (NO in step S103), the driving_ECU 14 proceeds to step S104. Then, the driving_ECU 14 calculates the target acceleration A of the vehicle M, and then proceeds to step S113.

That is, in step S104, the driving_ECU 14 determines whether there is a preceding vehicle P in front of the vehicle M. In the case where there is no preceding vehicle P, the driving_ECU 14 calculates the target acceleration A(Vs) for maintaining the vehicle speed V at a set vehicle speed Vs input by the driver.

In the case where there is a preceding vehicle P, the driving_ECU 14 calculates the target acceleration A(Lp) for maintaining the preceding vehicle distance Lp at the target preceding vehicle distance Lpt. That is, the driving_ECU 14 calculates the target acceleration A(Lp) based on the following equation (1), for example:

$$A(Lp)=ap+((V-Vp)^2/(Lp-Lpt)) \quad (1)$$

where ap in equation (1) is the acceleration of the preceding vehicle P.

In contrast, in the case where it is determined in step S103 that the vehicle driving path is currently congested (YES in step S103), the driving_ECU 14 proceeds to step S105. Then, in step S105, the driving_ECU 14 refers to a preset map or the like to set the extended target preceding vehicle distance Lpt' and the target following vehicle distance Lft, and then proceeds to step S106.

In step S106, the driving_ECU 14 calculates the target acceleration A(Lf) with respect to the target following vehicle distance Lft. That is, the driving_ECU 14 refers to, for example, the map illustrated in FIG. 3 or the like and calculates the target acceleration A(Lf) for converging the following vehicle distance Lf to the target following vehicle distance Lft.

Then, in step S107, the driving_ECU 14 refers to, for example, a map or the like corresponding to the currently-set target preceding vehicle distance Lpt', and performs acceleration/deceleration determination based on the relative relationship between the vehicle M and the preceding vehicle P. That is, the driving_ECU 14 refers to a map or the like, and determines whether to permit the vehicle M to accelerate or decelerate based on the preceding vehicle distance Lp and the preceding vehicle relative speed Vrp.

Then, in the case where it is determined in step S107 that the vehicle M is permitted to accelerate, the driving_ECU 14 proceeds to step S108. In contrast, in the case where it is determined in step S107 that the vehicle M is permitted to decelerate, the driving_ECU 14 proceeds to step S109.

Proceeding from step S107 to step S108, the driving_ECU 14 determines whether the target acceleration A(Lf) calculated in step S106 is greater than "0", that is, whether the target acceleration A(Lf) is a positive value which is a value on the acceleration side.

Then, in the case where it is determined in step S108 that the target acceleration A(Lf) is greater than "0" (YES in step S108), the driving_ECU 14 proceeds to step S113 while maintaining the current target acceleration A(Lf).

In contrast, in the case where it is determined in step S108 that the target acceleration A(Lf) is less than or equal to "0" (NO in step S108), the driving_ECU 14 proceeds to step S110.

Proceeding from step S108 to step S110, the driving_ECU 14 changes the target acceleration A(Lf) to "0", and then proceeds to step S113. That is, the driving_ECU 14 corrects the target acceleration A(Lf) to "0" in order to prevent deceleration which is unnecessary when acceleration is permitted based on the relationship between the vehicle M and the preceding vehicle P.

Meanwhile, proceeding from step S107 to step S109, the driving_ECU 14 determines whether the target acceleration A(Lf) calculated in step S106 is less than "0", that is, whether the target acceleration A(Lf) is a negative value which is a value on the deceleration side.

Then, in the case where it is determined in step S109 that the target acceleration A(Lf) is greater than or equal to "0" (NO in step S109), the driving_ECU 14 proceeds to step S110.

Proceeding from step S109 to step S110, the driving_ECU 14 changes the target acceleration A(Lf) to "0", and then proceeds to step S113. That is, the driving_ECU 14 corrects the target acceleration A(Lf) to "0" in order to prevent acceleration which is unnecessary when deceleration is permitted based on the relationship between the vehicle M and the preceding vehicle P.

In contrast, in the case where it is determined in step S109 that the target acceleration A(Lf) is less than "0" (YES in step S109), the driving_ECU 14 proceeds to step S111 while maintaining the current target acceleration A(Lf).

In step S111, the driving_ECU 14 calculates the target acceleration A(Lp) for maintaining the preceding vehicle distance Lp at the target preceding vehicle distance Lpt using, for example, the above-described equation (1), and then proceeds to step S112.

In step S112, the driving_ECU 14 selects the smaller (the value greater on the deceleration side) of the target acceleration A(Lp) calculated in step S111 and the target acceleration A(Lf) calculated in step S106 as the target acceleration A, and then proceeds to step S113.

Proceeding from step S104, step S108, step S110, or step S112 to step S113, the driving_ECU 14 applies driving control (that is, acceleration/deceleration control) to the vehicle M using the target acceleration A, and then exits the routine.

Figure 7:
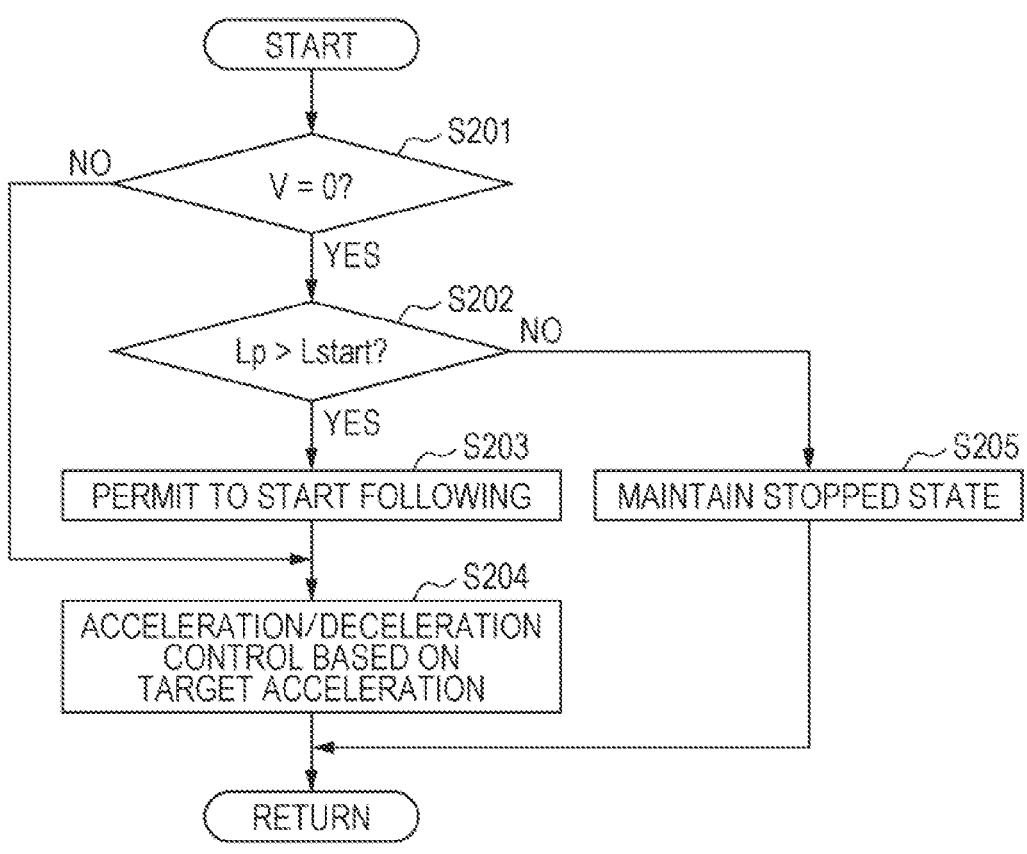
FIG. 7 is a flowchart illustrating a driving control subroutine.

The driving control applied to the vehicle M is performed in accordance with, for example, the flowchart of a driving control subroutine illustrated in FIG. 7. When the subroutine starts, in step S201, the driving_ECU 14 checks whether the current vehicle speed V is "0", that is, whether the vehicle M is in a stopped state following the preceding vehicle P.

Then, in the case where it is determined in step S201 that the vehicle M is not in a stopped state (NO in step S201), the driving_ECU 14 proceeds to step S204.

In contrast, in the case where it is determined in step S201 that the vehicle M is in a stopped state (YES in step S201), the driving_ECU 14 checks whether the preceding vehicle distance Lp is greater than a preset following start distance Lstart.

Then, in the case where it is determined in step S202 that the preceding vehicle distance Lp is less than or equal to the following start distance Lstart (NO in step S205), the driving_ECU 14 maintains the stopped state of the vehicle M, and then exits the subroutine.

In contrast, in the case where it is determined in step S202 that the preceding vehicle distance Lp is greater than the following start distance Lstart (YES in step S202), the driving_ECU 14 permits the vehicle M to start following the preceding vehicle P, and then proceeds to step S204.

Proceeding from step S201 or step S203 to step S204, the driving_ECU 14 applies acceleration/deceleration control to the vehicle M based on the currently-calculated target acceleration A, and then exits the subroutine. That is, in the case where the target acceleration A is a positive value, the driving_ECU 14 generates acceleration in the vehicle M according to the target acceleration A. In contrast, in the case where the target acceleration A is a negative value, the driving_ECU 14 generates deceleration in the vehicle M according to the target acceleration A. Note that, in order to prevent sudden acceleration and sudden deceleration of the vehicle M, it is desirable that the driving_ECU 14 apply the upper limit processing and lower limit processing to the target acceleration A.

Figure 8:
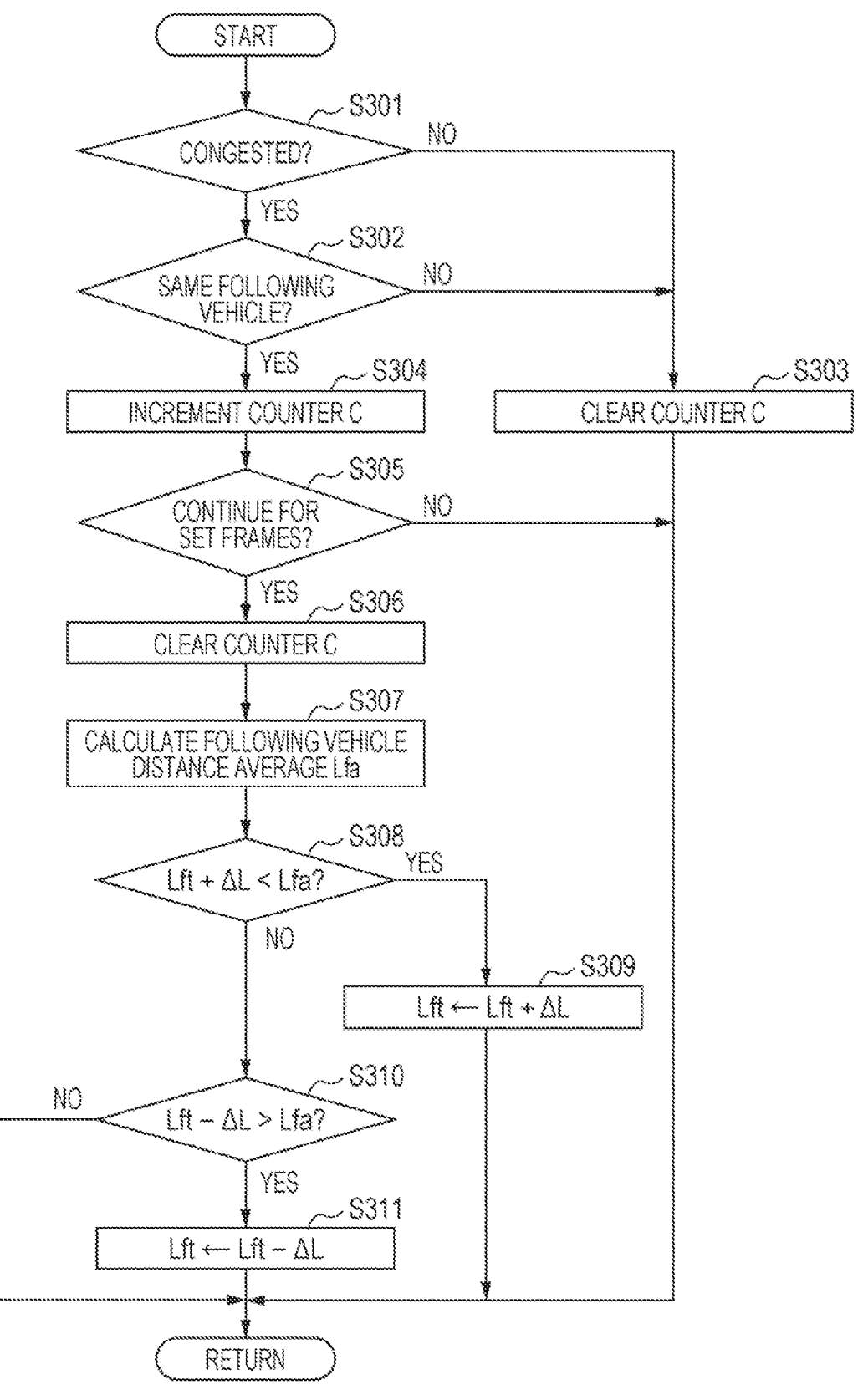
FIG. 8 is a flowchart illustrating a target following vehicle distance correction routine.

By the way, in the case of correcting the target following vehicle distance Lft based on the relative relationship between the vehicle M and the following vehicle F, the driving_ECU 14 executes, for example, the flowchart of a target following vehicle distance correction routine illustrated in FIG. 8. The routine is repeatedly performed every set time by the driving_ECU 14.

When the routine starts, in step S301, the driving_ECU 14 checks whether the vehicle driving path is currently congested.

Then, in the case where it is determined in step S301 that the vehicle driving path is not currently congested (NO in step S301), the driving_ECU 14 proceeds to step S303.

In contrast, in the case where it is determined in step S301 that the vehicle driving path is currently congested (YES in step S301), the driving_ECU 14 proceeds to step S302.

In step S302, the driving_ECU 14 checks whether the current following vehicle F is a following vehicle that is the same as the previous frame.

Then, in the case where it is determined in step S302 that the current following vehicle F is a following vehicle that is different from the previous frame (NO in step S302), the driving_ECU 14 proceeds to step S303.

Proceeding from step S301 or step S302 to step S303, the driving_ECU 14 clears a counter C indicating that the same following vehicle F continues (C←0), and then exits the routine.

In contrast, in the case where it is determined in step S302 that the current following vehicle F is a following vehicle that is the same as the previous frame (YES in step S302), the driving_ECU 14 proceeds to step S304.

In step S304, the driving_ECU 14 increments the counter C (C←C+1), and then proceeds to step S305.

In step S305, the driving_ECU 14 refers to the current counter C, and checks whether the same following vehicle F continues for set frames.

Then, in the case where it is determined in step S305 that the same following vehicle F does not continue for the set frames (NO in step S305), the driving_ECU 14 exits the routine as it is.

In contrast, in the case where it is determined in step S305 that the same following vehicle F continues for the set frames (YES in step S305), the driving_ECU 14 proceeds to step S306, where the counter C is cleared (C←0).

Then, in step S307, the driving_ECU 14 calculates the average Lfa of the following vehicle distance Lf during the set frames, and then proceeds to step S308.

In step S308, the driving_ECU 14 checks whether the calculated following vehicle distance average Lfa is greater than a value obtained by adding a certain value ΔL to the target following vehicle distance Lft (that is, whether Lft+ΔL<Lfa).

Then, in the case where it is determined in step S308 that the following vehicle distance average Lfa is greater than the value obtained by adding the certain value ΔL to the target following vehicle distance Lft (YES in step S308), the driving_ECU 14 proceeds to step S309. Then, in step S309, the driving_ECU 14 corrects the target following vehicle distance Lft to the increasing side by the certain value ΔL, and then exits the routine.

In contrast, in the case where it is determined in step S308 that the following vehicle distance average Lfa is less than or equal to the value obtained by adding the certain value ΔL to the target following vehicle distance Lft (NO in step S308), the driving_ECU 14 proceeds to step S310.

In step S310, the driving_ECU 14 checks whether the calculated following vehicle distance average Lfa is less than a value obtained by subtracting the certain value ΔL from the target following vehicle distance Lft (that is, whether Lft−ΔL>Lfa).

Then, in the case where it is determined in step S310 that the following vehicle distance average Lfa is less than the value obtained by subtracting the certain value ΔL from the target following vehicle distance Lft (YES in step S310), the driving_ECU 14 proceeds to step S311. Then, in step S311, the driving_ECU 14 corrects the target following vehicle distance Lft to the decreasing side by the certain value ΔL, and then exits the routine.

In contrast, in the case where it is determined in step S310 that the following vehicle distance average Lfa is greater than or equal to the value obtained by subtracting the certain value ΔL from the target following vehicle distance Lft (NO in step S310), the driving_ECU 14 exits the routine as it is.

According to the above-described embodiment, when the vehicle driving path is congested, the driving_ECU 14 sets the extended target preceding vehicle distance Lpt' and the target following vehicle distance Lft, in addition to the target preceding vehicle distance Lpt. Then, the driving_ECU 14 calculates the target acceleration A(Lf) for maintaining the following vehicle distance Lf from the vehicle M to the following vehicle F at the target following vehicle distance Lft, and determines whether to permit the vehicle M to accelerate or decelerate based on the relative relationship between the preceding vehicle distance Lp and the extended target preceding vehicle distance Lpt'. When the target acceleration A(Lf) is a value on the acceleration side and when it is determined that the vehicle M is permitted to accelerate, the driving_ECU 14 performs acceleration control using the target acceleration A(Lf). When the target acceleration A(Lf) is a value on the deceleration side and when it is determined that the vehicle M is permitted to decelerate, the driving_ECU 14 performs deceleration control using the target acceleration A(Lf). In doing so, appropriate driving control that takes into account the traffic flow including the following vehicle F can be performed.

That is, by setting the target preceding vehicle distance Lpt and the extended target preceding vehicle distance Lpt' to the preceding vehicle P in traffic jams, the vehicle-to-vehicle distance can have a certain width when the vehicle M drives following the preceding vehicle P. By performing acceleration/deceleration control for the following vehicle F within the range of the vehicle-to-vehicle distance having a certain width, while properly maintaining a safe distance from the preceding vehicle, appropriate driving control that takes into account the traffic flow including the following vehicle F can be performed.

Figure 9A:
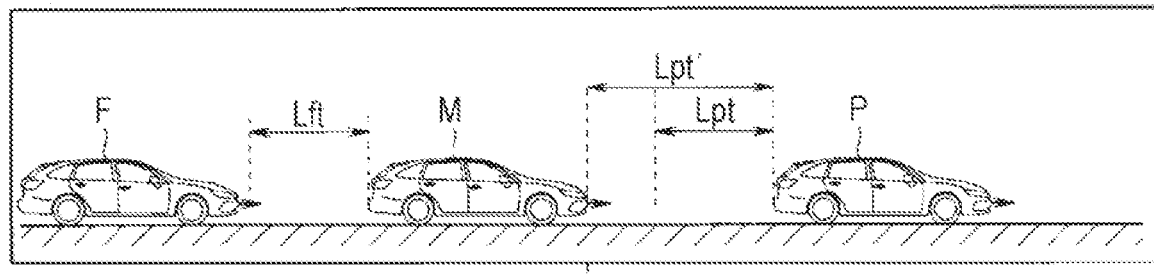
FIGS. 9A-9C are explanatory diagrams illustrating the behavior of the vehicle for the preceding vehicle and the following vehicle in a traffic jam.
Figure 9B:
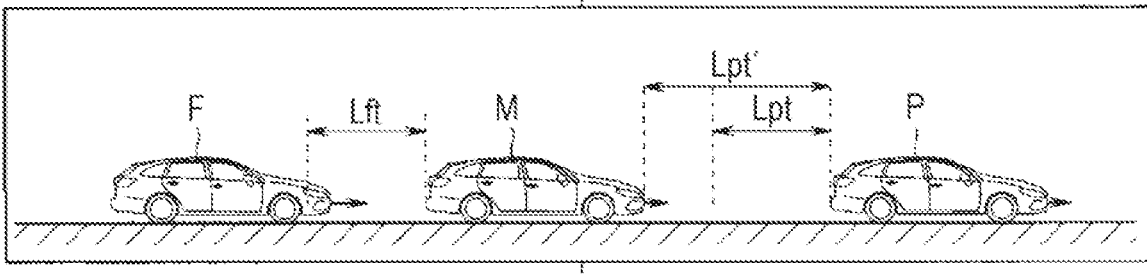
Figure 9C:
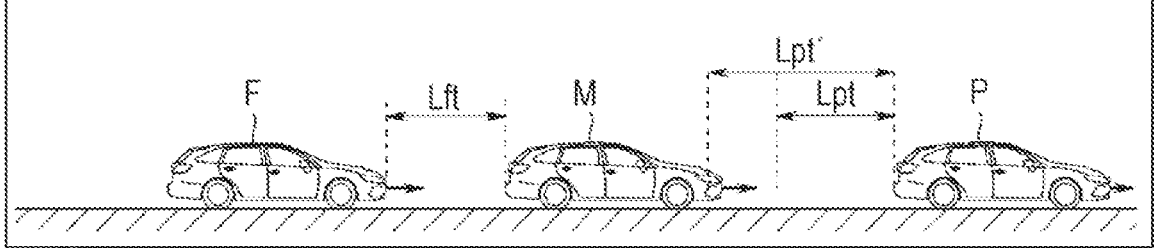

For example, as illustrated in FIGS. 9A-9C, if the following vehicle F accelerates or the like and the following vehicle distance Lf becomes less than the target following vehicle distance Lft, the driving_ECU 14 appropriately accelerates the vehicle M within a range in which the preceding vehicle distance Lp does not deviate significantly from the extended target preceding vehicle distance Lpt', and maintains the following vehicle distance Lf at the target following vehicle distance Lft. This makes it possible to reduce the frequency with which the following vehicle F brakes unnecessarily, and to adequately suppress the chain of brakes by vehicles following behind the following vehicle F. In addition, suppressing the chain of brakes as above can contribute to the elimination of traffic jams, and can also contribute to the improvement of fuel efficiency for the overall traffic flow of vehicles following behind the vehicle M.

Figure 10A:
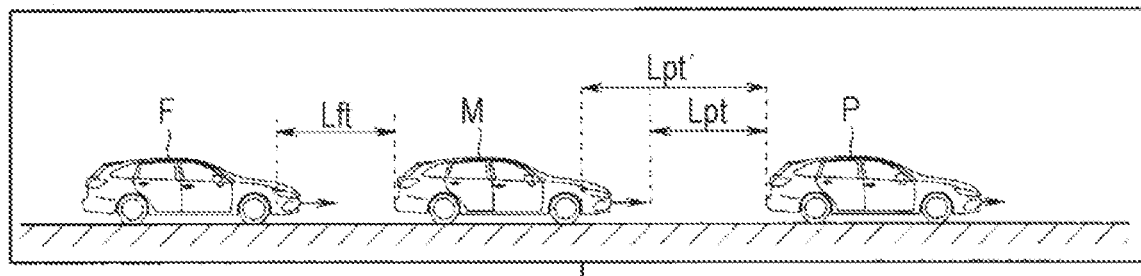
FIGS. 10A-10C are explanatory diagrams illustrating the behavior of the vehicle for the preceding vehicle and the following vehicle in a traffic jam.
Figure 10B:
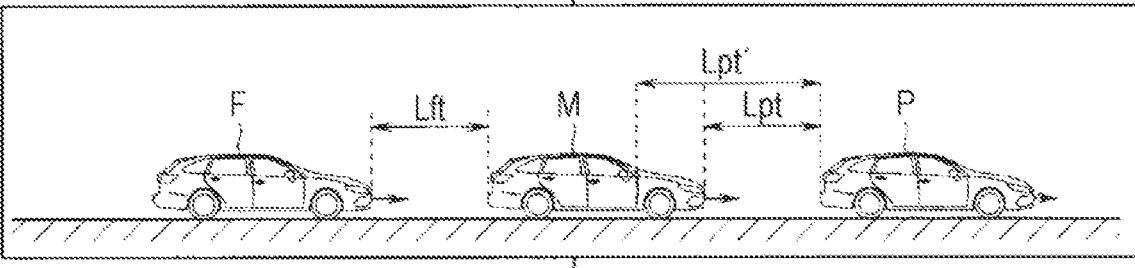
Figure 10C:
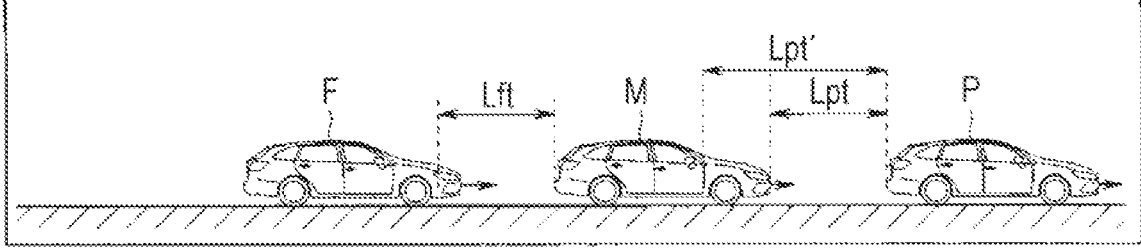

In that case, for example, as illustrated in FIGS. 10A-10C, if the preceding vehicle distance Lp becomes the target preceding vehicle distance Lpt due to the acceleration of the vehicle M, the driving_ECU 14 maintains the preceding vehicle distance Lp at the target preceding vehicle distance Lpt without further acceleration. This makes it possible to maintain a sufficient preceding vehicle distance Lp even when adaptive cruise control is performed with regard to the following vehicle F, and to adequately prevent the vehicle M from colliding with the preceding vehicle P.

Figure 11A:
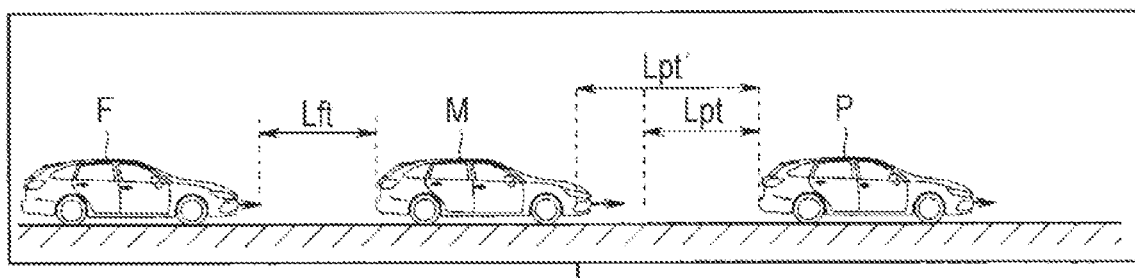
FIGS. 11A-11C are explanatory diagram illustrating the behavior of the vehicle for the preceding vehicle and the following vehicle in a traffic jam.
Figure 11B:
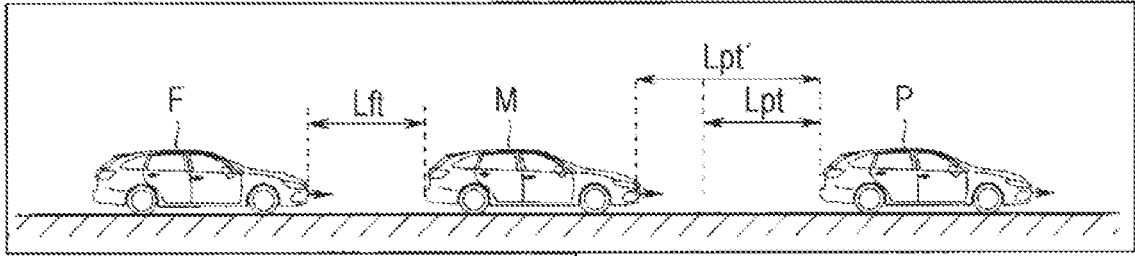
Figure 11C:
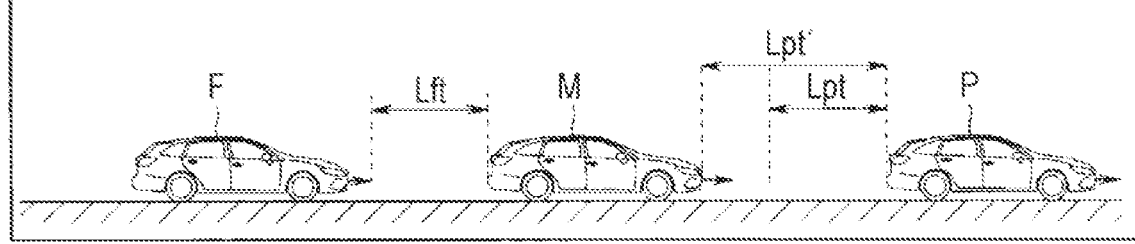

For example, as illustrated in FIGS. 11A-11C, if the following vehicle distance Lf becomes greater than the target following vehicle distance Lft, the driving_ECU 14 appropriately decelerates the vehicle M within a range in which the preceding vehicle distance Lp does not deviate significantly from the extended target preceding vehicle distance Lpt', and maintains the following vehicle distance Lf at the target following vehicle distance Lft. This makes it possible to reduce the frequency with which the following vehicle F performs unnecessary acceleration. Moreover, suppression of such unnecessary acceleration of the following vehicle F leads, as a result, to suppression of unnecessary deceleration of the following vehicle F in traffic jams.

Accordingly, the chain of brakes by vehicles following behind the following vehicle F can be adequately suppressed.

Furthermore, the extended target preceding vehicle distance Lpt' according to the present embodiment is set within a range of distance that can prevent another vehicle from cutting in in front of the vehicle M. Accordingly, it is possible to prevent the vehicle M from performing emergency braking control or the like due to another vehicle's intrusion, and furthermore, it is possible to adequately prevent the chain of emergency brakes of vehicles following behind the following vehicle F.

In addition, the driving_ECU 14 can also correct the target following vehicle distance Lft based on the relative relationship between the vehicle M and the following vehicle F. This makes it possible to reflect the feeling of the driver who drives the following vehicle F in the target following vehicle distance Lft, and in some embodiments, to suppress the number of brakes (unnecessary acceleration and deceleration) of the following vehicle F.

Here, in the above-described embodiment, the image recognition_ECU 13, the driving_ECU 14, the CP_ECU 21, the E/G_ECU 22, the T/M_ECU 23, the BK_ECU 24, the PS_ECU 25, and the like are formed of a conventional microcomputer including a central processing unit (CPU), random-access memory (RAM), read-only memory (ROM), and a non-volatile storage unit, and a peripheral device thereof. Fixed data such as programs executed by the CPU, data tables, and the like are stored in advance in the ROM. Note that all or some of the functions of the processor may be configured of a logic circuit or an analog circuit, and processing of various programs may be realized by an electronic circuit such as a field-programmable gate array (FPGA).

The disclosure described in the above embodiment is not limited to forms thereof, and various other modifications can be made at the implementation stage within a range not deviating from the gist thereof. Furthermore, the above-described embodiment includes various stages of the disclosure, and they can be extracted by appropriate combinations of constituent features disclosed herein.

For example, if some constituent features are removed from all the constituent features indicated in the above-described embodiment but the stated issue can still be solved and the stated effect can be achieved, then a configuration from which the constituent features have been removed can be extracted as a stage of the disclosure.

The image recognition_ECU 13 and the driving_ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image recognition_ECU 13 and the driving_ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A drive assist apparatus for a vehicle, the drive assist apparatus comprising:

one or more processors; and one or more memories storing instructions causing the one or more processors to:

recognize driving environment information on an outside of the vehicle, the outside including an area ahead of the vehicle and an area behind the vehicle;

set a target preceding vehicle distance to a preceding vehicle when the preceding vehicle is recognized based on the driving environment information; and perform driving control maintaining a preceding vehicle distance from the vehicle to the preceding vehicle at the target preceding vehicle distance, wherein the one or more processors are further caused to, when a driving path of the vehicle is congested, (i) set an extended target preceding vehicle distance by extending the target preceding vehicle distance by adding a set distance to the target preceding vehicle distance, and set a target following vehicle distance to a following vehicle, wherein the set distance is configured to prevent another vehicle from cutting in front of the vehicle and increases as a preceding vehicle speed increases, and the target following vehicle distance is configured to allow a driver driving the following vehicle to reduce a frequency of braking against the vehicle during the congestion, (ii) calculate a target acceleration based on a difference between (a) a following vehicle distance from the vehicle to the following vehicle and (b) the target following vehicle distance, to maintain the following vehicle distance at the target following vehicle distance, wherein the target acceleration is set to accelerate the vehicle with a greater acceleration as the following vehicle distance becomes less than the target following vehicle distance, and to decelerate the vehicle with a greater deceleration as the following vehicle distance becomes greater than the target following vehicle distance, (iii) determine whether to permit the vehicle to accelerate or decelerate based on a relative relationship between the preceding vehicle distance and the extended target preceding vehicle distance, wherein the determination prevents the vehicle from accelerating when the preceding vehicle distance is less than or equal to the extended target preceding vehicle distance and prevents the vehicle from decelerating when the preceding vehicle distance is greater than the extended target preceding vehicle distance, (iv) perform acceleration control using the target acceleration when the target acceleration is a value on an acceleration side and the vehicle is permitted to accelerate, (v) perform deceleration control using the target acceleration when the target acceleration is a value on a deceleration side and the vehicle is permitted to decelerate, (vi) maintain the following vehicle distance at the target following vehicle distance while controlling the preceding vehicle distance within a range between the target preceding vehicle distance and the extended target preceding vehicle distance, and (vii) when the vehicle is permitted to decelerate and the target acceleration is a value on the deceleration side, calculate a second target acceleration for maintaining the preceding vehicle distance at the target preceding vehicle distance, and select a smaller of the target acceleration and the second target acceleration as a final target acceleration for the deceleration control.

2. The drive assist apparatus for the vehicle according to claim 1, wherein the one or more processors are further caused to set a predetermined value as the target following vehicle distance, and correct the target following vehicle distance based on a relative relationship between the vehicle and the following vehicle.

3. The drive assist apparatus for the vehicle according to claim 1, wherein the one or more processors are further caused to reflect a relative speed between the vehicle and the preceding vehicle upon determining whether to permit the vehicle to accelerate or decelerate.

4. The drive assist apparatus for the vehicle according to claim 1, wherein the one or more processors are further caused to determine whether to permit the vehicle to accelerate or decelerate maintaining the following vehicle distance based on a relative relationship between the preceding vehicle distance and the extended target preceding vehicle distance, the following vehicle distance, and a relative speed of the preceding vehicle.

5. The drive assist apparatus for the vehicle according to claim 1, wherein the determination, based on a relative speed between the vehicle and the preceding vehicle, permits the vehicle to accelerate even when the preceding vehicle distance is less than or equal to the extended target preceding vehicle distance, and permits the vehicle to decelerate even when the preceding vehicle distance is greater than the extended target preceding vehicle distance.

6. The drive assist apparatus for the vehicle according to claim 5, wherein when the preceding vehicle distance is less than or equal to the extended target preceding vehicle distance, a region where acceleration is permitted becomes larger as the relative speed becomes greater, and when the preceding vehicle distance is greater than the extended target preceding vehicle distance, a region where deceleration is permitted becomes larger as the relative speed becomes greater on a negative side.

7. The drive assist apparatus for the vehicle according to claim 1, wherein when the preceding vehicle distance reaches the target preceding vehicle distance due to acceleration of the vehicle, the one or more processors are further caused to maintain the preceding vehicle distance at the target preceding vehicle distance without further acceleration.

8. The drive assist apparatus for the vehicle according to claim 1, wherein the one or more processors are further caused to correct the target acceleration to zero when the target acceleration is a value on the deceleration side and the vehicle is permitted to accelerate, and correct the target acceleration to zero when the target acceleration is a value on the acceleration side and the vehicle is permitted to decelerate.

9. A drive assist apparatus for a vehicle, the drive assist apparatus comprising:

circuitry configured to receive recognized driving environment information on an outside of the vehicle, the outside including an area ahead of the vehicle and an area behind the vehicle, set a target preceding vehicle distance to a preceding vehicle when the preceding vehicle is recognized based on the driving environment information, and perform driving control for maintaining a preceding vehicle distance from the vehicle to the preceding vehicle at the target preceding vehicle distance, wherein:

the circuitry is configured to, when a driving path of the vehicle is congested, (i) set an extended target preceding vehicle distance by extending the target preceding vehicle distance by adding a set distance to the target preceding vehicle distance, and set a target following vehicle distance to a following vehicle, wherein the set distance is configured to prevent another vehicle from cutting in front of the vehicle and increases as a preceding vehicle speed increases, and the target following vehicle distance is configured to allow a driver driving the following vehicle to reduce a frequency of braking against the vehicle during the congestion, (ii) calculate a target acceleration based on a difference between (a) a following vehicle distance from the vehicle to the following vehicle and (b) the target following vehicle distance, to maintain the following vehicle distance at the target following vehicle distance, wherein the target acceleration is set to accelerate the vehicle with a greater acceleration as the following vehicle distance becomes less than the target following vehicle distance, and to decelerate the vehicle with a greater deceleration as the following vehicle distance becomes greater than the target following vehicle distance, (iii) determine whether to permit the vehicle to accelerate or decelerate based on a relative relationship between the preceding vehicle distance and the extended target preceding vehicle distance, wherein the determination prevents the vehicle from accelerating when the preceding vehicle distance is less than or equal to the extended target preceding vehicle distance and prevents the vehicle from decelerating when the preceding vehicle distance is greater than the extended target preceding vehicle distance, (iv) perform acceleration control using the target acceleration when the target acceleration is a value on an acceleration side and the circuitry determines to permit the vehicle to accelerate,

(v) perform deceleration control using the target acceleration when the target acceleration is a value on a deceleration side and the circuitry determines to permit the vehicle to decelerate, (vi) maintain the following vehicle distance at the target following vehicle distance while controlling the preceding vehicle distance within a range between the target preceding vehicle distance and the extended target preceding vehicle distance, and (vii) when the vehicle is permitted to decelerate and the target acceleration is a value on the deceleration side, calculate a second target acceleration for maintaining the preceding vehicle distance at the target preceding vehicle distance, and select a smaller of the target acceleration and the second target acceleration as a final target acceleration for the deceleration control.

10. The drive assist apparatus for the vehicle according to claim 9, wherein the circuitry is further configured to determine whether to permit the vehicle to accelerate or decelerate maintaining the following vehicle distance based on a relative relationship between the preceding vehicle distance and the extended target preceding vehicle distance, the following vehicle distance, and a relative speed of the preceding vehicle.

11. The drive assist apparatus for the vehicle according to claim 9, wherein the circuitry is further configured to set a predetermined value as the target following vehicle distance, and correct the target following vehicle distance based on a relative relationship between the vehicle and the following vehicle.

12. The drive assist apparatus for the vehicle according to claim 9, wherein the circuitry is further configured to reflect a relative speed between the vehicle and the preceding vehicle upon determining whether to permit the vehicle to accelerate or decelerate.

13. The drive assist apparatus for the vehicle according to claim 9, wherein the determination, based on a relative speed between the vehicle and the preceding vehicle, permits the vehicle to accelerate even when the preceding vehicle distance is less than or equal to the extended target preceding vehicle distance, and permits the vehicle to decelerate even when the preceding vehicle distance is greater than the extended target preceding vehicle distance.

14. The drive assist apparatus for the vehicle according to claim 13, wherein when the preceding vehicle distance is less than or equal to the extended target preceding vehicle distance, a region where acceleration is permitted becomes larger as the relative speed becomes greater, and when the preceding vehicle distance is greater than the extended target preceding vehicle distance, a region where deceleration is permitted becomes larger as the relative speed becomes greater on a negative side.

15. The drive assist apparatus for the vehicle according to claim 9, wherein when the preceding vehicle distance reaches the target preceding vehicle distance due to acceleration of the vehicle, the circuitry is further configured to maintain the preceding vehicle distance at the target preceding vehicle distance without further acceleration.

16. The drive assist apparatus for the vehicle according to claim 9, wherein the circuitry is further configured to correct the target acceleration to zero when the target acceleration is a value on the deceleration side and the vehicle is permitted to accelerate, and correct the target acceleration to zero when the target acceleration is a value on the acceleration side and the vehicle is permitted to decelerate.

* * * * *